(12) United States Patent
Nakazaki et al.

(10) Patent No.: US 11,285,710 B2
(45) Date of Patent: Mar. 29, 2022

(54) MULTILAYER BODY

(71) Applicant: TEIJIN LIMITED, Osaka (JP)

(72) Inventors: Tomohiro Nakazaki, Osaka (JP); Kenta Imazato, Osaka (JP); Katsuhiro Yamanaka, Osaka (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 16/956,015

(22) PCT Filed: Dec. 12, 2018

(86) PCT No.: PCT/JP2018/045634
§ 371 (c)(1),
(2) Date: Jun. 19, 2020

(87) PCT Pub. No.: WO2019/124182
PCT Pub. Date: Jun. 27, 2019

(65) Prior Publication Data
US 2020/0316928 A1 Oct. 8, 2020

(30) Foreign Application Priority Data
Dec. 21, 2017 (JP) .............................. JP2017-245049

(51) Int. Cl.
*B32B 27/08* (2006.01)
*B32B 27/36* (2006.01)
(Continued)

(52) U.S. Cl.
CPC ............ *B32B 27/365* (2013.01); *B32B 27/08* (2013.01); *C08G 64/0208* (2013.01);
(Continued)

(58) Field of Classification Search
USPC .......................... 428/411, 412; 528/196, 198
See application file for complete search history.

(56) References Cited

U.S. PATENT DOCUMENTS 9,206,314 B2 * 12/2015 Okamoto ................ C08L 69/00
2012/0148847 A1 6/2012 Kinoshita et al.

FOREIGN PATENT DOCUMENTS

JP 04-270652 9/1992
JP 2006-036954 2/2006
(Continued)

OTHER PUBLICATIONS

JP2013202816A Machine Translation; Doi T. et al. (Year: 2013).*
(Continued)

*Primary Examiner* — Terressa Boykin

(74) *Attorney, Agent, or Firm* — Wenderoth, Lind & Ponack, L.L.P.

(57) ABSTRACT

A multilayer body includes at least one layer (A) made of a polycarbonate resin (A) whose main repeating units include a unit (a-1) composed of an ether diol residue represented by the following formula (1) and a unit (a-2) composed of a diol residue represented by the following formula (2), and at least one layer (B) containing an aromatic polycarbonate resin (B), wherein the molar ratio of the unit (a-1) is 50 to 96 mol % and the molar ratio of the unit (a-2) is 4 to 50 mol %, with respect to 100 mol % of the total repeating units of the polycarbonate resin (A) and the proportion of the aromatic polycarbonate resin (B) in the layer (B) containing an aromatic polycarbonate resin (B) is 30% by weight or more, and the multilayer body is excellent in heat resistance, impact resistance, surface hardness, adhesion, and chemical resistance.

[Chem. 1]

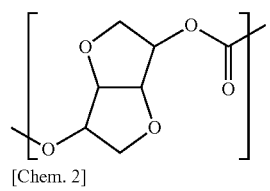

(1)

[Chem. 2]

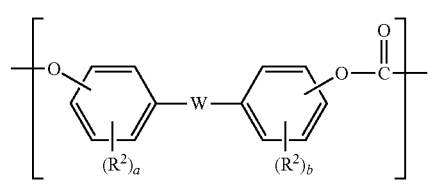

(2)

In the formula (2), $R^1$ and $R^2$ each independently represent at least one group selected from the group consisting of a hydrogen atom, a halogen atom, an alkyl group having 1 to 10 carbon atoms, an alkoxy group having 1 to 10 carbon atoms, a cycloalkyl having 6 to 20 carbon atoms, a cycloalkoxy group having 6 to 20 carbon atoms, an alkenyl group having 2 to 10 carbon atoms, an aryl group having 6 to 10 carbon atoms, an aryloxy group having 6 to 10 carbon atoms, an aralkyl group having 7 to 20 carbon atoms, an aralkyloxy group having 7 to 20 carbon atoms, a nitro group, an aldehyde group, a cyano group, and a carboxyl group, and when a plurality of $R^1$ and $R^2$ are present, they may be the same or different; a and b each represent an integer of 1 to 4; and W represents at least one bonding group selected from the group consisting of a single bond and a bonding group represented by the following formula (3).

[Chem. 3]

(Continued)

-continued

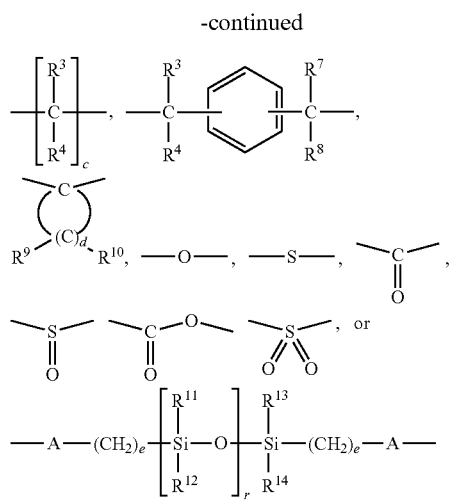

(3)

In the formula (3), $R^3$, $R^4$, $R^5$, $R^6$, $R^7$, $R^1$, $R^9$, and $R^{10}$ each independently represent at least one group selected from the group consisting of a hydrogen atom, an alkyl group having 1 to 10 carbon atoms, an aryl group having 6 to 10 carbon atoms, and an aralkyl group having 7 to 20 carbon atoms, and when a plurality of $R^3$, $R^4$, $R^5$, $R^6$, $R^7$, $R^8$, $R^9$, and $R^{10}$ are present, they may be the same or different; $R^{11}$, $R^{12}$, $R^{13}$, and $R^{14}$ each independently represent at least one group selected from the group consisting of an alkyl group having 1 to 10 carbon atoms, a cycloalkenyl group having 6 to 20 carbon atoms, an alkenyl group having 2 to 10 carbon atoms, an aryl group having 6 to 10 atoms, and an aralkyl group having 7 to 20 carbon atoms, and when a plurality of $R^{11}$, $R^{12}$, $R^{13}$, and $R^{14}$ are present, they may be the same or different; A represents a single bond, an oxygen atom or a sulfur atom; c represents an integer of 1 to 10; d represents an integer of 4 to 7; e represents an integer of 1 to 10; and f represents an integer of 1 to 100.

4 Claims, No Drawings

(51) Int. Cl.
 *C08G 64/02* (2006.01)
 *C08G 64/08* (2006.01)
 *C08G 64/10* (2006.01)

(52) U.S. Cl.
 CPC ......... *C08G 64/081* (2013.01); *C08G 64/085* (2013.01); *C08G 64/10* (2013.01); *B32B 2307/306* (2013.01); *B32B 2307/412* (2013.01); *B32B 2307/536* (2013.01); *B32B 2307/558* (2013.01); *B32B 2307/712* (2013.01); *B32B 2369/00* (2013.01)

(56) References Cited

FOREIGN PATENT DOCUMENTS

| | | |
|---|---|---|
| JP | 2009-046519 | 3/2009 |
| JP | 2009-079191 | 4/2009 |
| JP | 2010-037551 | 2/2010 |
| JP | 2011-127108 | 6/2011 |
| JP | 2011-156719 | 8/2011 |
| JP | 2011-201304 | 10/2011 |
| JP | 2013-202816 | 10/2013 |
| JP | 2013202816 | * 10/2013 |
| JP | 2017-071152 | 4/2017 |
| WO | 2011/021721 | 1/2013 |
| WO | 2012/144573 | 7/2014 |
| WO | 2015/119026 | 3/2017 |

OTHER PUBLICATIONS

Extended European Search Report dated Dec. 22, 2020 in corresponding European Patent Application No. 18892540.8.
International Search Report dated Feb. 12, 2019 in International (PCT) Application No. PCT/JP2018/045634.
Office Action dated Aug. 25, 2021, in corresponding Chinese Patent Application No. 201880082600.3, with English translation.

* cited by examiner

MULTILAYER BODY

TECHNICAL FIELD

The present invention relates to a multilayer body excellent in heat resistance, impact resistance, surface hardness, adhesion, and chemical resistance.

BACKGROUND ART

Polycarbonate resins made from bisphenol A have excellent heat resistance, impact resistance, flame retardancy, and transparency, and thus are widely used, for example, for vehicle applications or as building materials. Of these applications, especially for outdoor applications, high weather resistance is required. However, in general, the weather resistance of a polycarbonate resin is not so good as compared with other transparent materials such as acrylic resins, and yellowing or devitrification occurs upon outdoor exposure. Therefore, various studies have been made on measures for improving the weather resistance of polycarbonates. As one of such methods, a method in which a polycarbonate substrate is covered with an acrylic resin containing a weather-proofing agent has been used (PTL 1). With these methods, some improvement is seen in weather resistance. However, as an instinct problem, it is hard to say that the acrylic resin makes the characteristics of the polycarbonate be fully exerted in terms of impact resistance, heat resistance, and chemical resistance. Thus, there has been room for improvement.

In addition, in recent years, out of concerns about the depletion of petroleum resources, and also the problem of increasing carbon dioxide in the air, which causes global warming, much attention has been paid on biomass resources, whose raw materials are not dependent on petroleum, and which satisfy carbon neutral, that is, they do not increase carbon dioxide when combusted. Also in the field of polymers, biomass plastics produced from biomass resources have been vigorously developed. In particular, polycarbonates using isosorbide as a main monomer have excellent heat resistance, weather resistance, surface hardness, and chemical resistance, and their characteristics are different from those of ordinary polycarbonates made from bisphenol A. For this reason, they are attracting attention, and various studies have been made (PTLs 2 and 3). Such isosorbide polycarbonates have excellent heat resistance, impact resistance, and weather resistance. Meanwhile, their adhesion to general bisphenol A polycarbonates has not been considered. In reality, the adhesion to bisphenol A polycarbonates is significantly low, and it has been difficult to form a multilayer body.

In PTL 4 and PTL 5, a laminate with a bisphenol A polycarbonate is disclosed as a specific configuration. However, such a laminate is problematic in that the heat resistance and surface hardness of the isosorbide polycarbonate of the adhesion layer are low, requiring another coating layer, and also that the adhesion is significantly poor.

In PTL 6, a copolymer composition having isosorbide and a spiro ring is disclosed, and the heat resistance and the adhesion are considered, but the chemical resistance is not considered.

PTL 7 discloses a copolymer composition having isosorbide and an aromatic ring, but aims to improve the molecular weight and the mechanical properties, and does not describe a viewpoint of a laminate with an aromatic polycarbonate resin.

PTL 8 discloses a copolymer composition having isosorbide and an aromatic ring, but aims to improve the heat resistance, the low water absorbency, and the light resistance, and there is no description from the viewpoint of a laminate with an aromatic polycarbonate resin, and also the chemical resistance is not considered.

PTL 9 discloses a copolymer composition having isosorbide and an aromatic ring, and considering the heat resistance, the fluidity, the transparency, and the water absorbency, the adhesiveness with an aromatic polycarbonate resin is not described at all.

In PTL 10, a copolymer composition having isosorbide and tricyclodecanedimethanol is disclosed, and the heat resistance, the impact resistance, the surface hardness, and the adhesion are considered, but the chemical resistance is not described.

Accordingly, a multilayer body excellent in heat resistance, impact resistance, surface hardness, chemical resistance, and adhesion has not yet been provided.

CITATION LIST

Patent Literature

PTL 1: JP-A-4-270652
PTL 2: JP-A-2006-36954
PTL 3: JP-A-2009-46519
PTL 4: JP-A-2011-156719
PTL 5: JP-A-2011-201304
PTL 6: WO 2015/119026
PTL 7: JP-A-2010-37551
PTL 8: JP-A-2011-127108
PTL 9: WO 2012/144573
PTL 10: JP-A-2017-71152

SUMMARY OF INVENTION

Technical Problem

An object of the present invention is to provide a multilayer body excellent in heat resistance, impact resistance, surface hardness, chemical resistance, and adhesion.

Solution to Problem

The present inventors have conducted extensive research. As a result, they have found that when isosorbide and, as a copolymerization monomer, a monomer having an aromatic structure is contained in a certain ratio, and preferably further an aliphatic diol or alicyclic diol monomer is contained as a copolymerizable monomer in a certain ratio, excellent heat resistance, impact resistance, surface hardness, and chemical resistance are given, and also the adhesion to aromatic polycarbonates can be significantly improved. The invention has thus been accomplished.

That is, according to the present invention, the object of the invention can be achieved by the following items.

1. A multilayer body including: at least one layer (A) made of a polycarbonate resin (A) whose main repeating units include a unit (a-1) composed of an ether diol residue represented by the following formula (1) and a unit (a-2) composed of a diol residue represented by the following formula (2); and at least one layer (B) containing an aromatic polycarbonate resin (B), wherein the molar ratio of the unit (a-1) is 50 to 96 mol % and the molar ratio of the unit (a-2) is 4 to 50 mol %, with respect to 100 mol % of the total repeating units of the polycarbonate resin (A) and the proportion of the aromatic polycarbonate resin (B) in the layer (B) containing an aromatic polycarbonate resin (B) is 30% by weight or more:

[Chem. 1]

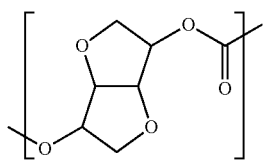

(1)

[Chem. 2]

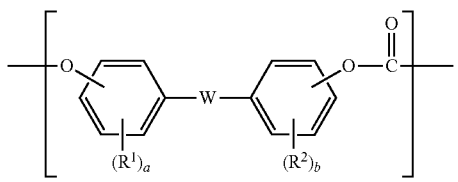

(2)

wherein in the formula (2), $R^1$ and $R^2$ each independently represent at least one group selected from the group consisting of a hydrogen atom, a halogen atom, an alkyl group having 1 to 10 carbon atoms, an alkoxy group having 1 to 10 carbon atoms, a cycloalkyl having 6 to 20 carbon atoms, a cycloalkoxy group having 6 to 20 carbon atoms, an alkenyl group having 2 to 10 carbon atoms, an aryl group having 6 to 10 carbon atoms, an aryloxy group having 6 to 10 carbon atoms, an aralkyl group having 7 to 20 carbon atoms, an aralkyloxy group having 7 to 20 carbon atoms, a nitro group, an aldehyde group, a cyano group, and a carboxyl group, and when a plurality of $R^1$ and $R^2$ are present, they may be the same or different; a and b each represent an integer of 1 to 4; and W represents at least one bonding group selected from the group consisting of a single bond and a bonding group represented by the following formula

[Chem. 3]

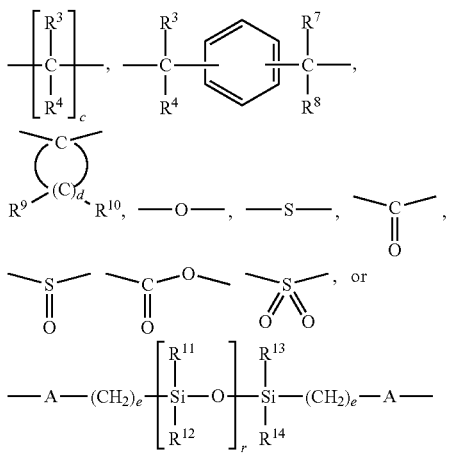

(3)

wherein in the formula (3), $R^3$, $R^4$, $R^5$, $R^6$, $R^7$, $R^8$, $R^9$, and $R^{10}$ each independently represent at least one group selected from the group consisting of a hydrogen atom, an alkyl group having 1 to 10 carbon atoms, an aryl group having 6 to 10 carbon atoms, and an aralkyl group having 7 to 20 carbon atoms, and when a plurality of $R^3$, $R^4$, $R^5$, $R^6$, $R^7$, $R^8$, $R^9$, and $R^{10}$ are present, they may be the same or different; $R^{11}$, $R^{12}$, $R^{13}$, and $R^{14}$ each independently represent at least one group selected from the group consisting of an alkyl group having 1 to 10 carbon atoms, a cycloalkenyl group having 6 to 20 carbon atoms, an alkenyl group having 2 to 10 carbon atoms, an aryl group having 6 to 10 atoms, and an aralkyl group having 7 to 20 carbon atoms, and when a plurality of $R^{11}$, $R^{12}$, $R^{13}$, and $R^{14}$ are present, they may be the same or different; A represents a single bond, an oxygen atom or a sulfur atom; c represents an integer of 1 to 10; d represents an integer of 4 to 7; e represents an integer of 1 to 10; and f represents an integer of 1 to 100.

2. The multilayer body according to item 1 above, wherein the polycarbonate resin (A) has a glass transition temperature of 100° C. to 160° C.

3. The multilayer body according to item 1 above, wherein the layer made of a polycarbonate resin (A) has a surface hardness of HB or higher.

4. The multilayer body according to item 1 above, wherein the polycarbonate resin (A) further contains a carbonate unit (a-3) composed of an aliphatic diol or alicyclic diol residue, and the molar ratio of the carbonate unit (a-3) is 1 to 20 mol % with respect to 100 mol % of the total repeating units of the polycarbonate resin (A).

5. The multilayer body according to item 1 above, wherein the aromatic polycarbonate resin (B) has a glass transition temperature of 120° C. to 180° C.

6. The multilayer body according to item 1 above, wherein the aromatic polycarbonate resin (B) is a polycarbonate resin using a dihydric phenol containing bisphenol A as a raw material.

Advantageous Effects of Invention

According to the present invention, a layer made of a polycarbonate resin containing, as structural units, isosorbide and a monomer having an aromatic structure in a certain ratio and a layer made of an aromatic polycarbonate resin are laminated, thereby making it possible to provide a multilayer body having excellent characteristics in terms of heat resistance, impact resistance, surface hardness, and chemical resistance, and also having excellent adhesion. Accordingly, the resulting industrial effects are remarkable.

DESCRIPTION OF EMBODIMENTS

The present invention will be described in detail hereinafter.
<Polycarbonate Resin>
(Polycarbonate Resin (A))

Main repeating units of the polycarbonate resin (A) forming the layer (A) of the present invention are configured by a unit (a-1) and a unit (a-2). "Main repeating units" means that the total of the unit (a-1) and the unit (a-2) based on the total repeating units is 55 mol % or more, preferably 60 mol % or more, more preferably 70 mol % or more, and still more preferably 80 mol % or more.

(Unit (a-1))

The unit (a-1) in the present invention is, as shown in the above formula (1), derived from an aliphatic diol compound having an ether group.

In the above formula (1), among biomass resources, a diol having an ether bond is a material having high heat resistance and pencil hardness.

As the formula (1), repeating units (1-1), (1-2), and (1-3) represented by the following formulae, which are in stereoisomeric relationships, are illustrated.

[Chem. 4]

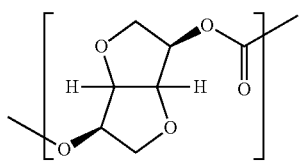

(1-1)

[Chem. 5]

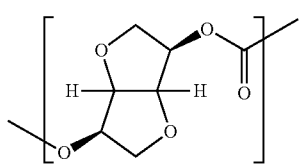

(1-2)

[Chem. 6]

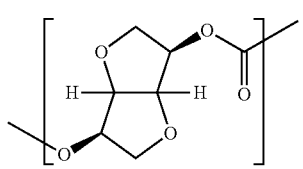

(1-3)

These are ether diols derived from carbohydrates, which are substances obtainable also from biomass in nature and one of substances called renewable sources. The repeating units (1-1), (1-2), and (1-3) are called isosorbide, isomannide, and isoidide, respectively. Isosorbide is obtained by hydrogenating D-glucose obtained from starch, followed by dehydration. Other ether diols can also be obtained from the same reaction, except for the starting materials.

Among isosorbide, isomannide, and isoidide, a repeating unit derived from isosorbide (1,4;3,6-dianhydro-D-sorbitol) is easy to produce and has excellent heat resistance, and thus is particularly preferable.

(Unit (a-2))

The unit (a-2) in the present invention is, as shown in the above formula (2), derived from a diol compound having an aromatic ring. Specific examples of the diol compound having an aromatic ring include 4,4'-biphenol, 3,3',5,5'-tetrafluoro-4,4'-biphenol, α,α'-bis(4-hydroxyphenyl)-o-diisopropylbenzene, α,α'-bis(4-hydroxyphenyl)-m-diisopropylbenzene (usually referred to as "bisphenol M"), α,α'-bis(4-hydroxyphenyl)-p-diisopropylbenzene, and α,α'-bis(4-hydroxyphenyl)-m-bis(1,1,1,3,3,3-hexafluoroisopropyl)benzene, 1,1-bis(4-hydroxyphenyl)cyclohexane, 1,1-bis(4-hydroxyphenyl)-3,3,5-trimethylcyclohexane, 1,1-bis(4-hydroxyphenyl)-4-isopropylcyclohexane, 1,1-bis(3-cyclohexyl-4-hydroxyphenyl)cyclohexane, 1,1-bis(4-hydroxyphenyl)cyclopentane, 1,1-bis(3-fluoro-4-hydroxyphenyl)cyclohexane, 1,1-bis(4-hydroxyphenyl)perfluorocyclohexane, 4,4'-dihydroxydiphenylether, 4,4'-dihydroxy-3,3'-dimethyldiphenylether, 4,4'-dihydroxydiphenylsulfone, 4,4'-dihydroxydiphenylsulfoxide, 4,4'-dihydroxydiphenylsulfide, 3,3'-dimethyl-4,4'-dihydroxydiphenyl sulfide, 3,3'-dimethyl-4,4'-dihydroxydiphenyl sulfone, 4,4'-dihydroxydiphenyl sulfone, 4,4'-dihydroxy-3,3'-dimethyl-4,4'-di-phenyl sulfoxide, 4,4'-dihydroxy-3,3'-diphenyl sulfone, 1,1-bis(4-hydroxyphenyl)methane, 1,1-bis(4-hydroxyphenyl)ethane, 2,2-bis(4-hydroxyphenyl)propane (commonly referred to as "bisphenol A"), 1,1-bis(4-hydroxyphenyl)-1-phenylethane, 2,2-bis(4-hydroxy-3-methylphenyl)propane (commonly referred to as "bisphenol C"), 2,2-bis(4-hydroxyphenyl)butane, 2,2-bis(4-hydroxyphenyl)pentane, 2,2-bis(4-hydroxy-3-phenylphenyl)propane, 2,2-bis(3-isopropyl-4-hydroxyphenyl)propane, 2,2-bis(3-t-butyl-4-hydroxyphenyl)propane, 2,2-bis(4-hydroxyphenyl)butane, 4,4-bis(4-hydroxyphenyl)heptane, 2,2-bis(4-hydroxyphenyl)octane, 1,1-bis(4-hydroxyphenyl)decane, 1,1-bis(3-methyl-4-hydroxyphenyl)decane, 1,1-bis(2,3-dimethyl-4-hydroxyphenyl)decane, 2,2-bis(3-bromo-4-hydroxyphenyl)propane, bis(4-hydroxyphenyl)diphenylmethane, 1,1-bis(4-hydroxyphenyl)-4-isopropylcyclohexane, 2,2-bis(4-hydroxyphenyl)-1,1,1,3,3,3-hexafluoropropane (commonly referred to as "bisphenol AF"), 6,6'-dihydroxy-3,3,3',3'-tetramethyl-1,1'-spirobiindane, 7,7'-dimethyl-6,6'-dihydroxy-3,3,3',3'-tetramethyl-1,1'-spirobiindane, 7,7'-diphenyl-6,6'-dihydroxy-3,3,3',3'-tetramethyl-1,1'-spirobiindane, 2,2-bis(4-hydroxy-3-methylphenyl)-1,1,1,3,3,3-hexafluoropropane, 2,2-bis(3,5-dimethyl-4-hydroxyphenyl)-1,1,1,3,3,3-hexafluoropropane, 2,2-bis(3-fluoro-4-hydroxyphenyl)-1,1,1,3,3,3-hexafluoropropane, and 2,2-bis(3,5-difluoro-4-hydroxyphenyl)-1,1,1,3,3,3-hexafluoropropane, 2,2-bis(3,5-dibromo-4-hydroxyphenyl)propane, 2,2-bis(3,5-dichloro-4-hydroxyphenyl)propane, 2,2-bis(3,5-dimethyl-4-hydroxyphenyl)propane, and 2,2-bis(3-cyclohexyl-4-hydroxyphenyl)propane.

Among them, bisphenol M, 1,1-bis(4-hydroxyphenyl)cyclohexane, 1,1-bis(4-hydroxyphenyl)-3,3,5-trimethylcyclohexane, 3,3'-dimethyl-4,4'-dihydroxydiphenyl sulfide, bisphenol A, bisphenol C, bisphenol AF, 6,6'-dihydroxy-3,3,3',3'-tetramethyl-1,1'-spirobiindane, and 1,1-bis(4-hydroxyphenyl)decane are preferable. Furthermore, bisphenol A, which is available inexpensively, is particularly preferred. These bisphenols may be used alone or may be used in combination of two or more kinds thereof.

(Other Units)

Diol compounds that derive other units aside from the unit (a-1) and the unit (a-2) may be any of aliphatic diol compounds and alicyclic diol compounds. Examples thereof include diol compounds described in WO 2004/111106 and WO 2011/021720 and oxyalkylene glycols such as diethylene glycol, triethylene glycol, tetraethylene glycol, and polyethylene glycol.

Examples of aliphatic diol compounds include 1,3-propanediol, 1,4-butanediol, 1,5-pentanediol, 1,6-hexanediol, 1,8-octanediol, 1,9-nonanediol, 1,10-decanediol, 1,12-dodecanediol, 2-methyl-1,3-propanediol, neopentyl glycol, 3-methyl-1,5-pentanediol, 2-n-butyl 2-ethyl-1,3-propanediol, 2,2-diethyl-1,3-propanediol, 2,4-diethyl-1,5-pentanediol, 1,2-hexaneglycol, 1,2-octylglycol, 2-ethyl-1,3-hexanediol, 2,3-diisobutyl-1,3-propanediol, 2,2-diisoamyl-1,3-propanediol, and 2-methyl-2-propyl-1,3-propanediol.

Examples of alicyclic diol compounds include cyclohexane dimethanol, tricyclodecane dimethanol, adamantanediol, pentacyclopentadecane dimethanol, and 2,2,4,4-tetramethyl-1,3-cyclobutanediol.

(Composition)

In the polycarbonate resin (A) used in the present invention, the main repeating units contain the unit (a-1) and the unit (a-2), and the molar ratio of the unit (a-1) is 50 to 96 mol % and the molar ratio of the unit (a-2) is 4 to 50 mol %, with respect to 100 mol % of the total repeating units of the polycarbonate resin (A). Such a molar ratio is preferable because the heat resistance, the impact resistance, the surface hardness, and the chemical resistance are increased and the adhesion to the aromaticpolycarbonate resin is also increased. Preferably, the molar ratio of the unit (a-1) is 55 to 95 mol %, and the molar ratio of the unit (a-2) is 5 to 45 mol %.

The polycarbonate resin (A) preferably further contains a carbonate unit (a-3) composed of the above-described aliphatic diol or alicyclic diol residue.

In this case, the molar ratio of the unit (a-1) in the polycarbonate resin (A) is preferably 50 to 95 mol %, more preferably 55 to 90 mol %, and still more preferably 60 to 85 mol %.

In addition, the molar ratio of the unit (a-2) in the polycarbonate resin (A) is preferably 4 to 49 mol %, more preferably 5 to 45 mol %, and still more preferably 7 to 35 mol %.

Furthermore, it is preferable to copolymerize the carbonate unit (a-3) in the polycarbonate resin (A) in a molar ratio of 1 to 20 mol %, because the effect of improving the surface hardness and the like is obtained. The molar ratio of the unit (a-3) is more preferably 2 to 18 mol %, and still more preferably 5 to 15 mol %.

The molar ratio can be measured and calculated by proton NMR of JNM-AL400 manufactured by JEOL Ltd.

When the composition is within the above range, the balance between adhesion to an aromatic polycarbonate resin (particularly a bisphenol Apolycarbonate resin) and chemical resistance is excellent, which is preferable. When the molar ratio of the unit (a-2) is smaller than the lower limit, the adhesion may be low, and when it is larger than the upper limit, the chemical resistance may be low and the fluidity may be low.

(Production Method for Polycarbonate Resin (A))

The polycarbonate resin (A) is produced by a reaction means for producing an ordinary polycarbonate resin, which itself is a known method, such as by allowing a carbonic acid diester or like carbonate precursor to react with a diol component. Next, basic techniques for such production methods will be briefly described.

A transesterification reaction using a carbonic acid diester as a carbonate precursor is carried out by a method in which a predetermined proportion of a diol component is stirred with a carbonic acid diester with heating in an inert gas atmosphere, and the produced alcohol or phenol is distilled. The reaction temperature depends on the boiling point of the produced alcohol or phenol, etc., but is usually within a range of 120 to 300° C. The reaction is carried out at reduced pressure from the initial stage, and the reaction is completed while distilling the produced alcohol or phenol. In addition, as necessary, an end terminator, an antioxidant, or the like may also be added.

Examples of carbonic acid diesters used for the transesterification reaction include esters of optionally substituted $C_{6-12}$ aryl groups and aralkyl groups. Specific examples thereof include diphenyl carbonate, ditolyl carbonate, bis (chlorophenyl)carbonate, and m-cresyl carbonate. Among them, diphenyl carbonate is particularly preferable. The amount of diphenyl carbonate used is preferably 0.97 to 1.10 mol, more preferably 1.00 to 1.06 mol, per mol of the total dihydroxy compound.

In addition, in a melt-polymerization method, a polymerization catalyst may be used to increase the polymerization rate. Examples of such polymerization catalysts include metal compounds, alkaline earth metal compounds, nitrogen-containing compounds, and metal compounds.

As such compounds, organic acid salts, inorganic salts, oxides, hydroxides, hydrides, alkoxides, and quaternary ammonium hydroxides of alkali metals and alkaline earth metals, for example, are preferably used. These compounds may be used alone or in combination.

Examples of alkali metal compounds include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium benzoate, potassium benzoate, cesium benzoate, lithium benzoate, disodium hydrogen phosphate, dipotassium hydrogen phosphate, dilithium hydrogen phosphate, disodium phenyl phosphate, disodium salt, dipotassium salt, dicesium salt, and dilithium salt of bisphenol A, and sodium salt, potassium salt, cesium salt, and lithium salt of phenol.

Examples of alkaline earth metal compounds include magnesium hydroxide, calcium hydroxide, strontium hydroxide, barium hydroxide, magnesium carbonate, calcium carbonate, strontium carbonate, barium carbonate, magnesium diacetate, calcium diacetate, strontium diacetate, barium diacetate, and barium stearate.

Examples of nitrogen-containing compounds include quaternary ammonium hydroxides having an alkyl or aryl group, etc., such as tetramethylammonium hydroxide, tetraethylammonium hydroxide, tetrapropylammonium hydroxide, tetrabutylammonium hydroxide, and trimethylbenzylammonium hydroxide. Examples also include tertiary amines, such as triethylamine, dimethylbenzylamine, and triphenylamine, and imidazoles, such as 2-methylimidazole, 2-phenylimidazole, and benzimidazole. Examples also include bases and basic salts such as ammonia, tetramethylammonium borohydride, tetrabutylammonium borohydride, tetrabutylammonium tetraphenylborate, and tetraphenylammonium tetraphenylborate.

Examples of metal compounds include zinc aluminum compounds, germanium compounds, organotin compounds, antimony compounds, manganese compounds, titanium compounds, and zirconium compounds. These compounds may be used alone or in combination of two or more kinds thereof.

The amount of polymerization catalyst used is selected from a range of preferably $1\times10^{-9}$ to $1\times10^{-2}$ equivalents, preferably $1\times10^{-8}$ to $1\times10^{-5}$ equivalents, and more preferably $1\times10^{-7}$ to $1\times10^{-3}$ equivalents, per mol of the diol component.

In addition, it is also possible to add a catalyst deactivator in the latter stage of the reaction. As catalyst deactivators to be used, known catalyst deactivators are effectively used. Among them, an ammonium salt or phosphonium salt of sulfonic acid is preferable. Further, salts of dodecylbenzenesulfonic acid, such as tetrabutylphosphonium dodecylbenzenesulfonate, and salts of p-toluenesulfonic acid, such as tetrabutylammonium p-toluenesulfonate, are preferable.

In addition, as esters of sulfonic acid, methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate, and phenyl p-toluenesulfonate are preferably used. Among them, it is most preferable to use tetrabutylphosphonium dodecylbenzenesulfonate.

With respect to the amount of catalyst deactivator used, in the case where at least one polymerization catalyst selected from alkali metal compounds and/or alkaline earth metal compounds is used, the catalyst deactivator may be used preferably in a proportion of 0.5 to 50 mol, more preferably in a proportion of 0.5 to 10 mol, and still more preferably in a proportion of 0.8 to 5 mol, per mol of the catalyst.
(Specific Viscosity: $\eta_{SP}$)

The specific viscosity ($\eta_{SP}$) of the polycarbonate resin (A) is preferably 0.2 to 1.5. When the specific viscosity is within a range of 0.2 to 1.5, the molded article has excellent strength and forming workability. The specific viscosity is more preferably 0.25 to 1.2, still more preferably 0.3 to 1.0, and particularly preferably 0.3 to 0.5.

Specific viscosity in the context of the present invention is determined from a solution prepared by dissolving 0.7 g of a polycarbonate resin in 100 ml of methylene chloride at 20° C. using an Ostwald viscometer.

$$\text{Specific Viscosity } (\eta_{SP}) = (t - t_0)/t_0$$

[$t_0$ is the number of seconds taken for methylene chloride to fall, and t is the number of seconds taken for the sample solution to fall]

Incidentally, the measurement of specific viscosity can be performed specifically in the following manner, for example. First, a polycarbonate resin is dissolved in 20 to 30 times the weight of methylene chloride, followed by Celite filtration to collect solubles. Subsequently, the solution is removed, followed by sufficient drying, thereby giving a solid of methylene chloride solubles. 0.7 g of the solid is dissolved in 100 ml of methylene chloride, and the specific viscosity of the resulting solution at 20° C. is determined using an Ostwald viscometer.
(Glass Transition Temperature: Tg)

The glass transition temperature (Tg) of the polycarbonate resin (A) is preferably 100 to 160° C., more preferably 110 to 150° C., and still more preferably from 120 to 140° C. When the Tg is within the above range, good heat-resistant stability and formability are exerted when used as an optical formed article, and thus is preferable.

Glass transition temperature (Tg) is measured using DSC 2910 manufactured by TA Instruments Japan at a temperature rise rate of 20° C./min.
(Pencil Hardness)

It is preferable that the layer made of a polycarbonate resin (A) has a pencil hardness of HB or higher. In terms of providing excellent scratch resistance, the pencil hardness is preferably F or higher. Incidentally, when the pencil hardness is not higher than 4H, the function is sufficient. In the present invention, pencil hardness is such hardness that no scratch mark is left when the resin of the present invention is scratched with a pencil having a specific pencil hardness, and it is preferable to use, as an index, pencil hardness used for the coating surface hardness test, which is measurable in accordance with JIS K-5600. As indicated by pencil hardness, softness increases in the following order: 9H, 8H, 7H, 6H, 5H, 4H, 3H, 2H, H, F, HB, B, 2B, 3B, 4B, 5B, and 6B, where 9H is the hardest, while 6B is the softest.
(Aromatic Polycarbonate Resin (B))

In the present invention, the aromatic polycarbonate resin (B) forming the layer (B) may be a homopolymer or a copolymer. In addition, the aromatic polycarbonate resin (B) may have a branched structure or a linear structure, or also may be a mixture of a branched structure and a linear structure.

As a production method for the aromatic polycarbonate resin (B) using a dihydric phenol as a raw material, any of known methods, such as a phosgene method, a transesterification method, and a pyridine method, may be used.

Typical examples of dihydric phenols include bisphenols. In particular, it is preferable to use 2,2-bis(4-hydroxyphenyl)propane, that is, bisphenol A. In addition, bisphenol A may be totally or partially substituted with other dihydric phenols. Examples of other dihydric phenols include bis(4-hydroxyphenyl)alkanes such as hydroquinone, 4,4-dihydroxydiphenyl, bis(4-hydroxyphenyl)methane, and 1,1-bis(4-hydroxyphenyl)ethane, bis(4-hydroxyphenyl)cycloalkanes such as 1,1-bis(4-hydroxyphenyl)cyclohexane, compounds such as bis(4-hydroxyphenyl)sulfide, bis(4-hydroxyphenyl)sulfone, bis(4-hydroxyphenyl)sulfoxide, and bis(4-hydroxyphenyl)ether, alkylated bisphenols such as 2,2-bis(3-methyl-4-hydroxyphenyl)propane and 2,2-bis(3,5-dimethyl-4-hydroxyphenyl)propane, and halogenated bisphenols such as 2,2-bis(3,5-dibromo-4-hydroxyphenyl)propane and 2,2-bis(3,5-dichloro-4-hydroxyphenyl)propane. An aromatic polycarbonate resin obtained by using bisphenol A in bisphenols in an amount of preferably 50 mol % or more, more preferably 70 mol % or more, still more preferably 80 mol % or more, and particularly preferably 90 mol % or more is desirable.

The glass transition temperature (Tg) of the aromatic polycarbonate resin (B) is preferably from 120 to 180° C., and more preferably from 140 to 160° C. When the Tg is within the above range, good heat-resistant stability and formability are exerted when used as an optical formed article, and thus is preferable.

Glass transition temperature (Tg) is measured using DSC 2910 manufactured by TA Instruments Japan at a temperature rise rate of 20° C./min.

In terms of the balance between dynamic characteristics and forming workability, the viscosity average molecular weight of the aromatic polycarbonate resin (B) used in the present invention is within a range of preferably 15,000 or more and 30,000 or less, and more preferably 20,000 or more and 27,000 or less. Here, the viscosity average molecular weight (M) of the aromatic polycarbonate resin (B) is determined by inserting the specific viscosity ($\eta_{SP}$) determined from a solution prepared by dissolving 0.7 g of a polycarbonate resin in 100 ml of methylene chloride at 20° C. using an Ostwald viscometer into the following equation.

$\eta_{SP}/c = [\eta] + 0.45 \times [\eta]^2 c$ (wherein [$\eta$] is intrinsic viscosity)

$[\eta] = 1.23 \times 10^{-4} M^{0.83}$ $c = 0.7$

In addition, the reduced viscosity of the aromatic polycarbonate resin (B) is measured at a temperature of 20.0° C.±0.1° C. using methylene chloride as a solvent at an aromatic polycarbonate resin concentration accurately adjusted to 0.60 g/dl, and is within a range of preferably 0.23 dl/g or more and 0.72 dl/g or less, and more preferably 0.27 dl/g or more and 0.61 dl/g or less.

The layer (B) containing an aromatic polycarbonate resin (B) may contain other components in addition to the aromatic polycarbonate resin (B) as long as the effects of the present invention are not significantly impaired. Examples of the other components include resins other than polycarbonate resins and thermoplastic elastomers. As the other components, one kind may be contained, or two or more kinds may be contained in any combination and ratio. Examples of the other resins include thermoplastic polyester resins such as polyethylene terephthalate resin (PET resin), polytrimethylene terephthalate (PTT resin), and polybutylene terephthalate resin (PBT resin); styrene-based resins such as polystyrene resin (PS resin), high impact polystyrene resin (HIPS), acrylonitrile-styrene copolymer (AS resin), acrylonitrile-butadiene-styrene copolymer (ABS resin), acrylonitrile-styrene-acrylic rubber copolymer (ASA resin), and acrylonitrile-ethylenepropylene rubber-styrene copolymer (AES resin); polyolefin resins such as polyethylene resin (PE resin), polypropylene resin (PP resin), cyclic cycloolefin resin (COP resin), and cyclic cycloolefin copolymer (COP) resin; polyamide resin (PA resin); polyimide resin (PI resin); polyetherimide resin (PEI resin); polyurethane resin (PU resin); polyphenylene ether resin (PPE resin); polyphenylene sulfide resin (PPS resin); polysulfone resin (PSU resin); and polymethacrylate resin (PMMA resin).

Among them, ABS resin, PP resin, PET resin, PBT resin, PPS resin, and PMMA resin are preferable, ABS resin, PP resin, and PET resin are more preferable, and ABS resin is particularly preferable.

The thermoplastic elastomer is not particularly limited, and examples thereof include a polystyrene elastomer, a polyolefin elastomer, a polyester elastomer, a polyurethane elastomer, a polyamide elastomer, and a fluoropolymer elastomer. Among them, a polyester elastomer is preferable.

The proportion of the aromatic polycarbonate resin (B) in the layer (B) containing an aromatic polycarbonate resin (B) is preferably 30% by weight or more, more preferably 50% by weight or more, still more preferably 70% by weight or more, particularly preferably 75% by weight or more, and particularly preferably 80% by weight or more.

The proportion of components other than the aromatic polycarbonate resin (B) in the layer (B) containing an aromatic polycarbonate resin (B) is preferably 70% by weight or less, more preferably 50% by weight or less, still more preferably 30% by weight or less, particularly preferably 25% by weight or less, and particularly preferably 20% by weight or less. If the proportion of the components other than the aromatic polycarbonate resin (B) is too high, the adhesiveness of the laminate sample described below tends to decrease.

<Additive>

In the polycarbonate resin (A) and the aromatic polycarbonate resin (B) (hereinafter collectively referred to as "polycarbonate resin") used in the present invention, according to the intended use or as necessary, additives such as heat stabilizers, plasticizers, light stabilizers, polymerization metal deactivators, flame retardants, lubricants, antistatic agents, surfactants, antimicrobials, UV absorbers, release agents, fillers, and compatibilizers may be blended.

(Heat Stabilizer)

In the polycarbonate resins used in the present invention, it is particularly preferable that a heat stabilizer is contained in order to suppress the molecular weight reduction and hue deterioration at the time of extrusion/forming. Examples of heat stabilizers include phosphorus heat stabilizers, phenol heat stabilizers, and sulfur heat stabilizers, and they may be used alone or in combination of two or more kinds thereof. In particular, because an ether diol residue of the unit (a-1) is likely to be degraded by heat and oxygen and colored, it is preferable that a phosphorus heat stabilizer is contained as a heat stabilizer. As a phosphorus stabilizer, it is preferable that a phosphite compound is blended. Examples of phosphite compounds include pentaerythritol phosphite compounds, phosphite compounds obtained by a reaction of a dihydric phenol to have a cyclic structure, phosphite compounds having other structures.

Specific examples of pentaerythritol phosphite compounds mentioned above include distearylpentaerythritoldiphosphite, bis(2,4-di-tert-butylphenyl)pentaerythritoldiphosphite, bis(2,6-di-tert-butyl-4-methylphenyl) pentaerythritoldiphosphite, bis(2,6-di-tert-butyl-4-ethylphenyl)pentaerythritoldiphosphite, phenylbisphenol A pentaerythritoldiphosphite, bis(nonylphenyl)pentaerythritoldiphosphite, and dicyclohexyl pentaerythritoldiphosphite. Among them, distearylpentaerythritoldiphosphite and bis(2,4-di-tert-butylphenyl)pentaerythritoldiphosphite are suitable.

Examples of phosphite compounds obtained by a reaction of a dihydric phenol to have a cyclic structure mentioned above include 2,2'-methylenebis(4,6-di-tert-butylphenyl) (2,4-di-tert-butylphenyl)phosphite, 2,2'-methylenebis(4,6-di-tert-butylphenyl) (2-tert-butyl-4-methylphenyl)phosphite, 2,2'-methylenebis(4-methyl-6-tert-butylphenyl) (2-tert-butyl-4-methylphenyl)phosphite, 2,2'-ethylidenebis (4-methyl-6-tert-butylphenyl) (2-tert-butyl-4-methylphenyl) phosphite, 2,2'-methylene-bis-(4,6-di-t-butylphenyl)octylphosphite, and 6-tert-butyl-4-[3-[(2,4,8,10)-tetra-tert-butyldibenzo[d,f][1,3,2]dioxaphosphepine-6-yl)oxy] propyl]-2-methylphenol.

Examples of phosphite compounds having other structures mentioned above include triphenyl phosphite, tris (nonylphenyl)phosphite, tridecyl phosphite, trioctyl phosphite, trioctadecyl phosphite, didecylmonophenyl phosphite, dioctylmonophenyl phosphite, diisopropylmonophenylphosphite, monobutyldiphenylphosphite, monodecyldiphenyl phosphite, monooctyldiphenyl phosphite, 2,2-methylenebis(4,6-di-tert-butylphenyl)octyl phosphite, tris (diethylphenyl)phosphite, tris(di-iso-propylphenyl) phosphite, tris(di-n-butylphenyl)phosphite, tris(2,4-di-tert-butylphenyl)phosphite, and tris(2,6-di-tert-butylphenyl) phosphite.

Aside from the various phosphite compounds, for example, phosphate compounds, phosphonite compounds, and phosphonate compounds can be mentioned.

Examples of phosphate compounds may include tributyl phosphate, trimethyl phosphate, tricresyl phosphate, triphenyl phosphate, trichlorophenyl phosphate, triethyl phosphate, diphenylcresylphosphate, diphenylmonoorthoxenyl phosphate, tributoxyethyl phosphate, dibutyl phosphate, dioctyl phosphate, and diisopropyl phosphate, and triphenyl phosphate and trimethyl phosphate are preferable.

Examples of phosphonite compounds include tetrakis(2, 4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite, and bis(2,6-di-tert-butylphenyl)-3-phenyl-phenyl phosphonite. Tetrakis(di-tert-butylphenyl)-biphenylene diphosphonite and bis(di-tert-butylphenyl)-phenyl-phenyl phosphonite are preferable, and tetrakis(2,4-di-tert-butylphenyl)-biphenylene diphosphonite and bis(2,4-di-tert-butylphenyl)-phenyl-phenyl phosphonite are more preferable. Such phosphonite compounds can be used together with the above phosphite compounds having an aryl group with two or more alkyl groups as substituents, and thus are preferable.

Examples of phosphonate compounds include dimethyl benzenephosphonate, diethyl benzenephosphonate, and dipropyl benzenephosphonate.

Among the phosphorus heat stabilizers mentioned above, trisnonylphenyl phosphite, trimethyl phosphate, tris(2,4-ditert-butylphenyl)phosphite, bis(2,4-di-tert-butylphenyl)pentaerythritol diphosphite, and bis(2,6-di-tert-butyl-4-methylphenyl)pentaerythritol diphosphite are preferably used.

The above phosphorus heat stabilizers may be used alone or in combination of two or more kinds thereof. The phosphorus heat stabilizer is blended in an amount of preferably 0.001 to 1 part by weight, more preferably 0.01 to 0.5 parts by weight, and still more preferably 0.01 to 0.3 parts by weight, per 100 parts by weight of the polycarbonate resin.

In the polycarbonate resins used in the present invention, for the purpose of suppressing the molecular weight reduction and hue deterioration at the time of extrusion/forming, a hindered phenolic heat stabilizer or a sulfur heat stabilizer may be added in combination with a phosphorus heat stabilizer as heat stabilizers.

Hindered phenolic heat stabilizers are not particularly limited as long as they have antioxidant functions, and examples thereof include n-octadecyl-3-(4'-hydroxy-3',5'-di-t-butylphenyl)propionate, tetrakis{methylene-3-(3',5'-di-t-butyl-4-hydroxyphenyl)propionate}methane, distearyl(4-hydroxy-3-methyl-5-t-butylbenzyl)malonate, triethyleneglycol-bis{3-(3-t-butyl-5-methyl-4-hydroxyphenyl)propionate}, 1,6-hexanediol-bis{3-(3,5-di-t-butyl-4-hydroxyphenyl)propionate}, pentaerythrityl-tetrakis{3-(3,5-di-t-butyl-4-hydroxyphenyl)propionate}, 2,2-thiodiethylenebis{3-(3,5-di-t-butyl-4-hydroxyphenyl)propionate}, 2,2-thiobis(4-methyl-6-t-butylphenol), 1,3,5-trimethyl-2,4,6-tris(3,5-di-t-butyl-4-hydroxybenzyl)benzene, tris(3,5-di-t-butyl-4-hydroxybenzyl)-isocyanurate, 2,4-bis{(octylthio)methyl}-o-cresol, isooctyl-3-(3,5-di-t-butyl-4-hydroxyphenyl)propionate, 2,5,7,8-tetramethyl-2 (4',8',12'-trimethyltridecyl)chroman-6-ol, and 3,3',3",5,5', 5"-hexa-t-butyl-α,α',α"-(mesitylene-2,4,6-triyl)tri-p-cresol.

Among them, n-octadecyl-3-(4'-hydroxy-3',5'-di-t-butylphenyl)propionate, pentaerythrityl-tetrakis{3-(3,5-di-t-butyl-4-hydroxyphenyl)propionate}, 3,3',3",5,5',5"-hexa-t-butyl-α,α',α'-(mesitylene-2,4,6-triyl)tri-p-cresol, 2,2-thiodiethylenebis{3-(3,5-di-t-butyl-4-hydroxyphenyl) propionate}, and the like are preferable.

These hindered phenolic heat stabilizers may be used alone or may be used in combination of two or more kinds thereof.

The hindered phenolic heat stabilizer is blended in an amount of preferably 0.001 to 1 part by weight, more preferably 0.01 to 0.5 parts by weight, and still more preferably 0.01 to 0.3 parts by weight, per 100 parts by weight of the polycarbonate resin.

Examples of sulfur heat stabilizers may include dilauryl-3,3'-thiodipropionate, ditridecyl-3,3'-thiodipropionate, dimyristyl-3,3'-thiodipropionate, distearyl-3,3'-thiodipropionate, lauryl stearyl-3,3'-thiodipropionate, pentaerythritol tetrakis(3-laurylthiopropionate), bis[2-methyl-4-(3-laurylthiopropionyloxy)-5-tert-butylphenyl]sulfide, octadecyl disulfide, mercaptobenzimidazole 2-mercapto-6-methylbenzimidazole, and 1,1'-thiobis(2-naphthol). Among them, pentaerythritol tetrakis(3-laurylthiopropionate) is preferable.

These sulfur heat stabilizers may be used alone or may be used in combination of two or more kinds thereof.

The sulfur heat stabilizer is blended in an amount of preferably 0.001 to 1 part by weight, more preferably 0.01 to 0.5 parts by weight, and still more preferably 0.01 to 0.3 parts by weight, per 100 parts by weight of the polycarbonate resin.

In the case where a phosphite heat stabilizer, a phenol heat stabilizer, and a sulfur heat stabilizer are used together, they are blended in a total amount of preferably 0.001 to 1 part by weight, more preferably 0.01 to 0.3 parts by weight, per 100 parts by weight of the polycarbonate resin.

(Release Agent)

In the polycarbonate resins used in the present invention, in order to further improve the mold release properties at the time of melt-forming, a release agent may also be blended to the extent that does not interfere the object of the present invention.

Examples of such release agents include higher fatty acid esters of monohydric or polyhydric alcohols, higher fatty acids, paraffin wax, beeswax, olefin waxes, olefin waxes containing carboxy groups and/or carboxylic anhydride groups, silicone oil, and organopolysiloxane.

Examples of higher fatty acid esters include partial esters or total esters of a $C_{1-20}$ monohydric or polyhydric alcohol and a $C_{10-30}$ saturated fatty acid. Examples of such partial esters or total esters of a monohydric or polyhydric alcohol and a saturated fatty acid include monoglyceride stearate, diglyceride stearate, triglyceride stearate, monosorbitate stearate, stearyl stearate, monoglyceride behenate, behenyl behenate, pentaerythritol monostearate, pentaerythritol tetrastearate, pentaerythritol tetrapelargonate, propyleneglycol monostearate, stearyl stearate, palmityl palmitate, butyl stearate, methyl laurate, isopropyl palmitate, biphenyl biphenate, sorbitan monostearate, and 2-ethylhexyl stearate.

Among them, monoglyceride stearate, triglyceride stearate, pentaerythritol tetrastearate, and behenyl behenate are preferably used.

As higher fatty acids, $C_{10-30}$ saturated fatty acids are preferable. Examples of such fatty acids include myristic acid, lauric acid, palmitic acid, stearic acid, and behenic acid.

These release agents may be used alone or may be used in combination of two or more kinds thereof. The amount of such a release agent blended is preferably 0.01 to 5 parts by weight per 100 parts by weight of the polycarbonate resin.

(UV Absorber)

The polycarbonate resins used in the present invention may contain a UV absorber. Examples of UV absorbers include benzotriazole UV absorbers, benzophenone UV absorbers, triazine UV absorbers, cyclic iminoester UV absorbers, and cyanoacrylate UV absorbers. Among them, benzotriazole UV absorbers are preferable.

Examples of benzotriazole UV absorbers may include benzotriazole UV absorbers represented by 2-(2'-hydroxy-5'-methylphenyl)benzotriazole, 2-(2'-hydroxy-5'-tert-butylphenyl)benzotriazole, 2-(2'-hydroxy-5'-tert-octylphenyl)benzotriazole, 2-(2'-hydroxy-3',5'-di-tert-butylphenyl) benzotriazole, 2-(2'-hydroxy-3',5'-di-tert-amylphenyl) benzotriazole, 2-(2'-hydroxy-3'-dodecyl-5'-methylphenyl) benzotriazole, 2-(2'-hydroxy-3',5'-bis(α,α'-dimethylbenzyl) phenylbenzotriazole, 2-[2'-hydroxy-3'-(3",4",5",6"-tetra-phthalimidomethyl)-5'-methylphenyl]benzotriazole, 2-(2'-hydroxy-3'-tert-butyl-5'-methylphenyl)-5-chlorobenzo triazole, 2-(2'-hydroxy-3',5'-di-tert-butylphenyl)-5-chlorobenzotriazole, 2,2'-methylenebis[4-(1,1,3,3-tetrametyl-butyl)-6-(2H-benzotriazol-2-yl)phenol], and methyl-3-[3-tert-butyl-5-(2H-benzotriazol-2-yl)-4-hydroxyphenyl propionate-polyethylene glycol condensates.

The proportion of such a UV absorber is preferably 0.01 to 2 parts by weight, more preferably 0.1 to 1 part by weight, and still more preferably 0.2 to 0.5 parts by weight, per 100 parts by weight of the polycarbonate resin.

(Light Stabilizer)

The polycarbonate resins used in the present invention may contain a light stabilizer. The presence of a light stabilizer is preferable in terms of weather resistance and also has an advantage in that the molded article is resistant to cracking.

Examples of light stabilizers include hindered amines, such as 1,2,2,6,6-pentamethyl-4-piperidyl methacrylate, bis (2,2,6,6-tetramethyl-1-octyloxy-4-piperidinyl)didecanoate, bis(1,2,2,6,6-pentamethyl-4-piperidinyl)-[[3,5-bis(1,1-dim ethylethyl)-4-hydroxyphenyl]methyl]butylmalonate, 2,4-bis [N-butyl-N-(1-cyclohexyloxy-2,2,6,6-tetramethylpiperidin-2-yl)amino]-6-(2-hydroxyethylamine)-1,3,5-triazine, bis(1, 2,2,6,6-pentamethyl-4-piperidinyl)sebacate, methyl(1,2,2,6, 6-pentamethyl-4-piperidinyl)sebacate, bis(2,2,6,6-tetramethyl-4-piperidyl)carbonate, bis(2,2,6,6-tetramethyl-4-piperidyl)succinate, bis(2,2,6,6-tetramethyl-4-piperidyl) sebacate, 4-benzoyloxy-2,2,6,6-tetramethylpiperidine, 4-octanoyloxy-2,2,6,6-tetramethylpiperidine, bis(2,2,6,6-tetramethyl-4-piperidyl)diphenylmethane-p,p'-dicarbamate, bis(2,2,6,6-tetramethyl-4-piperidyl)benzene-1,3-disulfonate, and bis(2,2,6,6-tetramethyl-4-piperidyl)phenylphosphite, and nickel complexes, such as nickel bis (octylphenyl sulfide, nickel complex-3,5-di-t-butyl-4-hydroxybenzyl phosphate monoethylate, and nickel dibutyldithiocarbamate. These light stabilizers may be used alone or in combination of two or more kinds thereof. The light stabilizer content is preferably 0.001 to 1 part by weight, more preferably 0.01 to 0.5 parts by weight, with respect to 100 parts by weight of the polycarbonate resin.

(Epoxy Stabilizer)

In the polycarbonate resins used in the present invention, in order to improve the hydrolyzability, an epoxy compound may be blended without interfering with the object of the invention of the present application.

Examples of epoxy stabilizers include epoxidized soybean oil, epoxidized linseed oil, phenyl glycidyl ether, allyl glycidyl ether, t-butylphenyl glycidyl ether, 3,4-epoxycyclohexylmethyl-3',4'-epoxycyclohexyl carboxylate, 3,4-epoxy-6-methylcyclohexylmethyl-3',4'-epoxy-6'-methylcyclohexyl carboxylate, 2,3-epoxycyclohexylmethyl-3',4'-epoxycyclohexyl carboxylate, 4-(3,4-epoxy-5-methylcyclohexyl)butyl-3',4'-epoxycyclohexyl carboxylate, 3,4-epoxycyclohexyl ethyleneoxide, cyclohexylmethyl-3,4-epoxycyclohexyl carboxylate, 3,4-epoxy-6-methylcyclohexylmethyl-6'-methylcyclohexyl carboxylate, bisphenol A diglycidyl ether, tetrabromobisphenol A glycidyl ether, diglycidyl ester of phthalic acid, diglycidyl ester of hexahydrophthalic acid, bis-epoxydicyclopentadienyl ether, bis-epoxyethylene glycol, bis-epoxycyclohexyl adipate, butadiene diepoxide, tetraphenylethylene epoxide, octyl epoxy tallate, epoxidized polybutadiene, 3,4-dimethyl-1,2-epoxycyclohexane, 3,5-dimethyl-1,2-epoxycyclohexane, 3-methyl-5-t-butyl-1,2-epoxycyclohexane, octadecyl-2,2-dimethyl-3,4-epoxycyclohexyl carboxylate, N-butyl-2,2-dimethyl-3,4-epoxycyclohexyl carboxylate, cyclohexyl-2-methyl-3,4-epoxycyclohexyl carboxylate, N-butyl-2-isopropyl-3,4-epoxy-5-methylcyclohexyl carboxylate, octadecyl-3,4-epoxycyclohexyl carboxylate, 2-ethylhexyl-3',4'-epoxycyclohexyl carboxylate, 4,6-dimethyl-2,3-epoxycyclohexyl-3',4'-epoxycyclohexyl carboxylate, 4,5-epoxytetrahydrophthalic anhydride, 3-t-butyl-4,5-epoxytetrahydrophthalic anhydride, diethyl-4,5-epoxy-cis-1,2-cyclohexyl dicarboxylate, and di-n-butyl-3-t-butyl-4,5-epoxy-cis-1,2-cyclohexyl dicarboxylate. Bisphenol A diglycidyl ether is preferable in terms of compatibility, etc.

It is preferable that such an epoxy stabilizer is blended in an amount within a range of 0.0001 to 5 parts by weight, preferably 0.001 to 1 part by weight, and still more preferably 0.005 to 0.5 parts by weight, with respect to 100 parts by weight of the polycarbonate resin.

(Bluing Agent)

In the polycarbonate resins used in the present invention, in order to cancel out a yellow tinge of a lens caused by the polymer or UV absorber, a bluing agent may be blended. As bluing agents, those used for polycarbonates may be used without any particular inconvenience. Generally, anthraquinone dyes are easily obtainable and thus preferable.

Specifically, typical examples of bluing agents include generic name: Solvent Violet 13 [CA. No. (Color Index No.) 60725], generic name: Solvent Violet 31 [CA. No. 68210, generic name: Solvent Violet 33 [CA. No. 60725], generic name: Solvent Blue 94 [CA. No. 61500], generic name: Solvent Violet 36 [CA. No. 68210], generic name: Solvent Blue 97 ["Macrolex Violet RR" manufactured by Bayer], and generic name: Solvent Blue 45 [CA. No. 61110].

These bluing agents may be used alone or may be used in combination of two or more kinds thereof. Such a bluing agent is preferably blended in a proportion of $0.1 \times 10^{-4}$ to $2 \times 10^{-4}$ parts by weight with respect to 100 parts by weight of the polycarbonate resin.

(Flame Retardant)

In the polycarbonate resins used in the present invention, a flame retardant may also be blended. Examples of flame retardants include halogen flame retardants such as brominated epoxy resins, brominated polystyrenes, brominated polycarbonates, brominated polyacrylates, and chlorinated polyethylenes, phosphate flame retardants such as monophosphate compounds and phosphate oligomer compounds, organic phosphorus flame retardants other than phosphate flame retardants, such as phosphinate compounds, phosphonate compounds, phosphonitrile oligomer compounds, and phosphonic amide compounds, and organometallic salt flame retardants such as alkaline (earth) metal organic sulfonates, metallic borate flame retardants, and metallic stannate flame retardants, as well as silicone flame retardants, ammonium polyphosphate flame retardants, and triazine flame retardants. In addition, separately, flame-retardant synergists (e.g., sodium antimonate, antimony trioxide, etc.), dripping inhibitors (fibril-forming polytetrafluoroethylene, etc.) and the like may also be blended and used together with the flame retardant.

Among the above flame retardants, compounds containing no chlorine or bromine atom reduce the factors considered to be undesirable for incineration disposal and thermal recycling. Such compounds are thus more suitable as flame retardants for use in the molded article of the present invention, which reduces the environmental impact as one feature.

In the case where a flame retardant is blended, it is preferable that the amount is within a range of 0.05 to 50 parts by weight per 100 parts by weight of the polycarbonate resin. When the amount is less than 0.05 parts by weight, sufficient flame retardancy is not developed, while when the amount is more than 50 parts by weight, the strength, heat resistance, and the like of the molded article are impaired.

(Elastomeric Polymer)

In the polycarbonate resins used in the present invention, an elastomeric polymer may be used as an impact modifier. Examples of elastomeric polymers include natural rubber and graft copolymers obtained by copolymerizing, with a rubber component having a glass transition temperature of 10° C. or lower, one kind or two or more kinds of monomer selected from aromatic vinyls, vinyl cyanide, acrylic acid esters, methacrylic acid esters, and vinyl compounds copolymerizable therewith. More suitable elastomeric polymers are core-shell type graft copolymers obtained by graft copolymerization of one kind or two or more kinds of shell monomer with a core rubber component.

In addition, examples also include block copolymers of such a rubber component and the above monomer. Specific examples of such block copolymers may include thermoplastic elastomers such as a styrene-ethylene propylene-styrene elastomer (hydrogenated styrene-isoprene-styrene elastomer) and a hydrogenated styrene-butadiene-styrene elastomer. Further, it is also possible to use other various elastomeric polymers known as thermoplastic elastomers, such as a polyurethane elastomer, a polyester elastomer, and a polyetheramide elastomer.

As impact modifiers, core-shell type graft copolymers are more suitable. In a core-shell type graft copolymer, the particle size of the core is, as a weight average particle diameter, preferably 0.05 to 0.8 μm, more preferably 0.1 to 0.6 μm, and still more preferably 0.1 to 0.5 μm. When the particle size is within a range of 0.05 to 0.8 μm, even better impact resistance is achieved. The rubber component content in the elastomeric polymer is preferably 40% or more, and still more preferably 60% or more.

Examples of rubber components may include a butadiene rubber, a butadiene-acrylic composite rubber, an acrylic rubber, an acrylic-silicone composite rubber, an isobutylene-silicone composite rubber, an isoprene rubber, a styrene-butadiene rubber, a chloroprene rubber, an ethylene-propylene rubber, a nitrile rubber, an ethylene-acrylic rubber, a silicone rubber, an epichlorohydrin rubber, a fluororubber, and those obtained by hydrogenating unsaturated bonds of such rubbers. Considering the concern about the generation of harmful substances at the time of combustion, rubber components containing no halogen atom are preferable in terms of environmental load.

The glass transition temperature of the rubber component is preferably −10° C. or lower, and more preferably −30° C. or lower. As the rubber component, a butadiene rubber, a butadiene-acrylic composite rubber, an acrylic rubber, and an acrylic-silicone composite rubber are particularly preferable. A composite rubber is a rubber made of two kinds of rubber components copolymerized or inseparably entangled with each other and polymerized to form an IPN structure.

Examples of aromatic vinyls in vinyl compounds to be copolymerized with a rubber component may include styrene, α-methylstyrene, p-methylstyrene, alkoxy styrenes, and halogenated styrenes, and styrene is particularly preferable. In addition, examples of acrylic acid esters may include methyl acrylate, ethyl acrylate, butyl acrylate, cyclohexyl acrylate, and octyl acrylate, while examples of methacrylic acid esters may include methyl methacrylate, ethyl methacrylate, butyl methacrylate, cyclohexyl methacrylate, and octyl methacrylate, and methyl methacrylate is particularly preferable. Among them, it is particularly preferable that a methacrylic acid ester, such as methyl methacrylate, is contained as an essential component. More specifically, a methacrylic acid ester is contained in an amount of preferably 10% by weight or more, more preferably 15% by weight or more, based on 100% by weight of the graft component (in the case of a core-shell type polymer, based on 100% by weight of the shell).

The elastomeric polymer containing a rubber component having a glass transition temperature of 10° C. or lower may be produced by any polymerization method such as bulk polymerization, solution polymerization, suspension polymerization, or emulsion polymerization, and the copolymerization technique may be one-stage grafting or multi-stage grafting. In addition, it may also be a mixture with a copolymer composed only of the graft component by-produced at the time of production. Further, as polymerization methods, aside from the general emulsion polymerization method, a soap-free polymerization method using an initiator such as potassium peroxodisulfate, a seed polymerization method, a two-stage swelling polymerization method, and the like can also be mentioned. In addition, in a suspension polymerization method, it is also possible to employ a method in which an aqueous phase and a monomer phase are separately maintained and precisely fed to a continuous dispersing machine, and the particle size is controlled by the rotation speed of the dispersing machine, a method in which, in a continuous production method, a monomer phase is fed into an aqueous liquid having dispersive power through a small-diameter orifice having a diameter of several to several tens of micrometers or a porous filter, thereby controlling the particle size, etc. In the case of a core-shell type graft polymer, both for the core and shell, the reaction may be completed in one stage or multi stage.

Such elastomeric polymers are commercially available and easily obtainable. For example, examples of elastomeric polymers containing a butadiene rubber, an acrylic rubber, or a butadiene-acrylic composite rubber as a main rubber component include Kaneace B series (e.g., B-56 etc.) of Kanegafuchi Chemical Industry Co., Ltd., Metablen C series (e.g., C-223A, etc.) and W series (e.g., W-450A, etc.) of Mitsubishi Rayon Co., Ltd., Paraloid EXL series (e.g., EXL-2602, etc.), HIA series (e.g., HIA-15, etc.), BTA series (e.g., BTA-III, etc.), and KCA series of Kureha Chemical Industry Co., Ltd., Paraloid EXL series and KM series (e.g., KM-336P, KM-357P, etc.) of Rohm and Haas Company, and UCL Modifier Resin series (UMG-AXS Resin series of UMG ABS, Ltd.) of Ube Cycon Co., Ltd. Examples of elastomeric polymers containing an acrylic-silicone composite rubber as a main rubber component include those commercially available from Mitsubishi Rayon Co., Ltd., under trade names Metablen S-2001 and SRK-200.

It is preferable that the compositional proportion of the impact modifier is 0.2 to 50 parts by weight, preferably 1 to 30 parts by weight, and more preferably 1.5 to 20 parts by weight, per 100 parts by weight of the polycarbonate resin. Within this range, the composition can be provided with excellent impact resistance, while suppressing a decrease in rigidity.

(Filler)

In the layer (B) containing a polycarbonate resin (B) of the present invention, various fillers can be blended as a reinforcing filler as long as the effects of the present invention are exhibited. Examples of the filler include calcium carbonate, glass fibers, glass beads, glass balloons, glass milled fibers, glass flakes, carbon fibers, carbon flakes, carbon beads, carbon milled fibers, graphite, vapor-grown ultrafine carbon fibers (fiber diameter: less than 0.1 μm), carbon nanotubes (fiber diameter: less than 0.1 μm, hollow), fullerene, metal flakes, metal fibers, metal-coated glass fibers, metal-coated carbon fibers, metal-coated glass flakes, silica, metal oxide particles, metal oxide fibers, metal oxide balloons, and various whiskers (potassium titanate whiskers, aluminum borate whiskers, and basic magnesium sulfate). These reinforcing fillers may be included alone or in combination of two or more kinds thereof.

The content of these fillers is preferably 0.1 to 100 parts by weight, and more preferably 0.5 to 50 parts by weight, with respect to 100 parts by weight of the layer containing an aromatic polycarbonate resin (B).

(Multilayer Body)

The multilayer body of the present invention can be widely used as a molded article such as a film, a sheet, or a plate. As a method for forming the multilayer body, a known method such as co-extrusion, extrusion lamination, heat lamination, dry lamination, or insert molding can be used. Among them, it is particularly preferable to use a co-extrusion method or an insert molding method.

In the case of co-extrusion, a resin constituting each layer of the multilayer body and an additive are combined through a feed block or a multi-manifold die using a plurality of extruders to form the multilayer body. In order to further improve the strength and impact resistance of the multilayer body, the multilayer body obtained in the above-described step may be stretched uniaxially or biaxially by a roll method, a tenter method, a tubular method or the like.

In the case of an insert molded article, it is produced, for example, by the following method.

[Preforming Step]

This is a step of performing preforming for processing a decorative film into a desired shape prior to insert molding in accordance with the shape of the molded article. Since the decorative film can be insert-molded into a complicated three dimensional shape by performing the preforming, it is preferable to perform the preforming.

Examples of the preforming method include the following methods. That is, first, the decorative film is heated while being held by a clamp or the like, and the decorative film is softened to be plastically deformable. Thereafter, the softened decorative film is vacuum-sucked through a plurality of vacuum holes of the vacuum forming mold, and the decorative film is brought into close contact with the surface of the mold along the shape of the mold surface. The method of bringing the mold into close contact with the surface of the mold is not necessarily vacuum suction, but vacuum suction is generally used. When the decorative film is cooled and cured, a decorative film to which a desired molded article shape is transferred is obtained.

[Trimming Step]

An excess portion other than the mirror surface portion of the mold of the decorative film obtained in the preforming step is cut off and trimmed into a desired shape. Trimming can be performed using a laser, die-cut, or the like. Die-cut (blanking) is more common than laser.

[Insert Molding Step]

A decorative film processed into a desired shape by the preforming step and the trimming step is attached to a mold on the movable side. Next, a base resin is injected from a nozzle of an injection molding machine and introduced into the cavity. At this time, the decorative film receives pressure from the base resin and adheres to the mold. Then, the heat of the base resin causes the decorative film and the base resin to adhere to each other.

The total thickness of the multilayer body of the present invention is preferably 0.03 to 300 mm, more preferably 0.05 to 100 mm, still more preferably 0.1 to 10 mm, and particularly preferably 0.5 to 3 mm. The proportion of the layer made of a polycarbonate resin (A) in the total thickness of all layers of the multilayer body is preferably 1% or more and 60% or less, more preferably 3% or more and 55% or less, and still more preferably 5% or more and 50% or less. When the thickness of the layer made of a polycarbonate resin (A) is within this range, a multilayer body having excellent surface hardness and heat resistance and further having excellent impact resistance can be provided.

The multilayer body of the present invention molded as a film, a sheet, or a plate has excellent transparency, impact resistance, and heat resistance, and also has excellent UV discoloration resistance and surface hardness. Accordingly, although the applications are not limited, the multilayer body of the present invention is usable as, for example, a building material, an interior material, a transparent sheet such as a display cover, a sheet for resin-coated metal plates, a sheet for forming (vacuum/pressure forming, hot press forming, etc.) a colored plate, a transparent plate, a shrink film, a shrink label, a shrink tube, an automotive interior material, resin glazing, an electrical appliance member, an OA appliance member, etc.

(Surface Treatment)

The multilayer body of the present invention may be subjected to various surface treatments. Surface treatments herein are treatments to form another layer on the surface layer of a resin molded article, such as deposition (physical vapor deposition, chemical vapor deposition, etc.), plating (electroplating, electroless plating, hot dip plating, etc.), painting, coating, and printing, and ordinary methods used for polycarbonate resins are applicable. Specific examples of surface treatments include hard coating, water-repellent/oil-repellent coating, UV absorbing coating, IR absorbing coating, metallizing (vapor deposition, etc.), and like various surface treatments. Hard coating is a particularly preferred and required surface treatment.

EXAMPLES

Hereinafter, the present invention will be described in detail with reference to examples. However, the present invention is not limited thereto. Incidentally, in the Examples, "part" means "part by weight". The used resins and evaluation methods used in the Examples are as follows.

1. Polymer Compositional Ratio (NMR)

Each repeating unit was measured using Proton NMR of JNM-AL400 manufactured by JEOL Ltd., to calculate the polymer compositional ratio (molar ratio).

2. Specific Viscosity

Specific viscosity was determined from a solution prepared by dissolving 0.7 g of a polycarbonate resin in 100 ml of methylene chloride at 20° C. using an Ostwald viscometer.

$$\text{Specific Viscosity } (\eta_{SP}) = (t - t_0)/t_0$$

[$t_0$ is the number of seconds taken for methylene chloride to fall, and t is the number of seconds taken for the sample solution to fall]

3. Glass Transition Temperature (Tg)

Glass transition temperature was measured from 8 mg of a sample using Thermoanalysis System DSC-2910 manufactured by TA Instruments in accordance with JIS K7121 in a nitrogen atmosphere (nitrogen flow rate: 40 ml/min) at a temperature rise rate of 20° C./min.

4. Pencil Hardness

In accordance with JIS K5400, in a thermostatic room at ambient temperature of 23° C., on the surface of the first layer (layer (A)) of a laminate sample cut to a size of 80 mm×60 mm, a line was drawn with a pencil maintained at an angle of 45° under a load of 1 kg, and the surface conditions were visually evaluated.

5. Adhesion

The surfaces (first layer; layer (A) side) of the laminate sample and the insert molded article were cross-cut using a cutter knife so that 100 cuts (grid pattern) of 1 mm² were made. Then, a cellophane adhesive tape was completely adhered onto the prepared cross-cut, and one end of the tape was lifted and peeled upward. This peeling operation was performed three times at the same position. Thereafter, the number of peeled grids was determined according to the criteria described below.

"A": No peeling.
"C": Peeled.

6. Chemical Resistance

With reference to the literature ("2013 Prospects of Decorative Film-Related Markets and Maker Strategies", pages 118 to 122, Fuji Keizai), a commercially available suntan cream (Mentholatum Skin Aqua SPF-45, manufactured by ROHTO Pharmaceutical Co., Ltd.) was uniformly applied to the surfaces of the laminate samples (first layer; layer (A) side), and after heat treatment at 80° C. for 4 hours, the surface appearance after wiping with a cloth was visually confirmed. Surface appearance was determined according to the criteria described below.

"A": Clean wiping off, no influence.
"C": Difficulty in wiping or whitening.

7. Impact Resistance

The insert molded article was subjected to a high-speed surface impact test. Using a high-speed impact tester Shimadzu HYDROSHOTHITS-P10 (Shimadzu Corporation), a high-speed surface impact test was performed 5 times at a test temperature of 23° C., a test speed of 7 m/sec, a striker diameter of ½ inch, and a holder diameter of 1 inch. The failure mode at that time was visually observed and determined according to the criteria described below.

"A": The number of times showing ductile fracture was 3 or more out of 5.
"C": The number of times showing brittle fracture was 2 or less out of 5.

[Polycarbonate Resin (A)]

PC1 (Example)

Structural unit derived from isosorbide (hereinafter ISS)/structural unit derived from 2,2-bis(4-hydroxyphenyl)propane (hereinafter BPA)/structural unit derived from 1,9-nonanediol (hereinafter ND)=81/7/12 (mol %), specific viscosity: 0.373

PC2 (Example)

Structural unit derived from ISS/structural unit derived from BPA/structural unit derived from ND=73/20/7 (mol %), specific viscosity: 0.351

PC3 (Example)

Structural unit derived from ISS/structural unit derived from BPA/structural unit derived from ND=60/30/10 (mol %), specific viscosity: 0.370

PC4 (Example)

Structural unit derived from ISS/structural unit derived from BPA=68/32 (mol %), specific viscosity: 0.370

PC5 (Comparative Example)

Structural unit derived from ISS/structural unit derived from BPA/structural unit derived from ND=84/3/13 (mol %), specific viscosity: 0.327

PC6 (Comparative Example)

Structural unit derived from ISS/structural unit derived from spiro glycol (hereinafter SPG)/ND=65/30/5 (mol %), specific viscosity: 0.362

PC7 (Comparative Example)

Structural units derived from ISS/structural unit derived from cyclohexane dimethanol (hereinafter CHDM)=50/50 (mol %), specific viscosity: 0.367

PC8 (Comparative Example)

Structural unit derived from ISS/structural unit derived from CHDM=70/30 (mol %), specific viscosity: 0.361

PC9 (Comparative Example)

Structural unit derived from ISS/structural unit derived from tricyclodecane dimethanol (hereinafter TCDDM)=70/30 (mol %), specific viscosity: 0.363

[Aromatic Polycarbonate Resin (B)]

PC10 (Example, Comparative Example)

Aromatic polycarbonate resin (Aromatic polycarbonate resin derived from bisphenol A), manufactured by Teijin Limited, Panlite L-1250Y, Tg 145° C., viscosity average molecular weight: 22,000

PC11 (Example, Comparative Example)

PC (aromatic polycarbonate resin derived from bisphenol A)/ABS resin=70 parts by weight/30 parts by weight, manufactured by Teijin Limited, Multilon T-2711J PC12 (Example, Comparative Example)

90 parts by weight of PC resin Panlite L-1250Y manufactured by Teijin Limited.
10 parts by weight of thermoplastic elastomer Nouvelan TRB-EL1 manufactured by Teijin Limited.
The above materials were melt-kneaded at 280° C. by a twin-screw extruder to uniformly mix the respective components, and the mixture was extruded as a strand having a diameter of about 2 mm and cut to obtain pellets. This was designated as PC12 (Tg 120° C.).

[PMMA]
Acrypet MF manufactured by Mitsubishi Rayon Co., Ltd.

Example 1

<Production of Polycarbonate Resin A>

95 parts of isosorbide (hereinafter abbreviated as ISS), 13 parts of 2,2-bis(2-hydroxyphenyl)propane (hereinafter abbreviated as BPA), 15 parts of 1,9-nonanediol (hereinafter abbreviated as ND), and 176 parts of diphenyl carbonate (hereinafter abbreviated as DPC), together with $0.7 \times 10^{-2}$ parts of tetramethylammonium hydroxide and $0.8 \times 10^{-3}$ parts of barium stearate as catalysts, were heated to 185° C. in a nitrogen atmosphere and melted. Thereafter, the temperature was raised to 200° C. and the vacuum degree was adjusted to 8.0 kPa over 70 minutes. Thereafter, the temperature was raised to 240° C. and the vacuum degree was adjusted to 1 kPa over further 30 minutes. The mixture was maintained at that temperature for 10 minutes, and then the vacuum degree was adjusted to 133 Pa or less. After the completion of the reaction, the mixture was discharged from the bottom of the reaction tank under a positive pressure of nitrogen and, with cooling in a water tank, cut with a pelletizer to obtain pellets (PC1). The obtained pellets were subjected to the various evaluations. The evaluation results are shown in Table 1.

<Production of Insert Molded Article>

Using the polycarbonate resin (A) as a decorative film and the aromatic polycarbonate resin (B) as a base material, an insert molded article was produced.

(Production of Decorative Film)

Pellets of PC1 were melted by a twin-screw extruder having a screw diameter of 15 mm, extruded through a T-die having a set temperature of 230° C., and the obtained sheet was cooled by a mirror-finished roll to obtain a decorative film. The discharge amount of the molten resin was adjusted so that the thickness of the decorative film was 0.1 mm.

(Preforming Step)

The decorative film was brought into close contact with a pre-shaping mold heated to 80° C. while being held by a clamp, and the mold was closed to form a desired molded article shape.

(Trimming Step)

An excess portion other than the mirror surface portion of the mold of the decorative film obtained in the preforming step was cut off with scissors.

(Insert Molding Step)

The decorative film processed into a desired shape by the preforming step and the trimming step was attached to a mold on the movable side. The pellets of PC10 were dried at 120° C. for 12 hours by a hot air dryer, and molded at a cylinder temperature of 300° C. and a mold temperature of 80° C. by a molding machine having a mold clamping force of 100 t to obtain an insert molded article having a thickness of 2 mm. The obtained insert molded article was subjected to various evaluations by the above-described evaluation methods. The evaluation results are shown in Table 1.

Example 2

<Production of Insert Molded Article>

The same operation and the same evaluation as in Example 1 were performed except that pellets of PC11 were used instead of PC10 in Example 1, and molding was performed at a cylinder temperature of 275° C. The evaluation results are shown in Table 1.

Example 3

<Production of Insert Molded Article>

The same operation and the same evaluation as in Example 1 were performed except that pellets of PC 12 were used instead of PC 10 in Example 1, and molding was performed at a cylinder temperature of 275° C. The evaluation results are shown in Table 1.

Example 4

<Production of Polycarbonate Resin A>

The operation was performed in exactly the same manner as in Example 1, except that 85 parts of ISS, 36 parts of BPA, 9 parts of ND, and 176 parts of DPC were used as raw materials, and the same evaluation was performed (PC2) The results are shown in Table 1.

<Production of Insert Molded Article>

The same operation and the same evaluation as in Example 1 were performed except that pellets of PC2 were used instead of PC1 in Example 1. The evaluation results are shown in Table 1.

Example 5

<Production of Insert Molded Article>

The same operation and the same evaluation as in Example 4 were performed except that pellets of PC11 were used instead of PC10 in Example 4, and molding was performed at a cylinder temperature of 275° C. The evaluation results are shown in Table 1.

Example 6

<Production of Insert Molded Article>

The same operation and the same evaluation as in Example 4 were performed except that pellets of PC 12 were used instead of PC 10 in Example 4, and molding was performed at a cylinder temperature of 275° C. The evaluation results are shown in Table 1.

Example 7

The operation was performed in exactly the same manner as in Example 1, except that 70 parts of ISS, 54 parts of BPA, 13 parts of ND, and 176 parts of DPC were used as raw materials, and the same evaluation was performed (PC3) The results are shown in Table 1.

<Production of Insert Molded Article>

The same operation and the same evaluation as in Example 1 were performed except that pellets of PC3 were used instead of PC1 in Example 1. The evaluation results are shown in Table 1.

Example 8

<Production of Insert Molded Article>

The same operation and the same evaluation as in Example 7 were performed except that pellets of PC11 were used instead of PC10 in Example 7, and molding was performed at a cylinder temperature of 275° C. The evaluation results are shown in Table 1.

Example 9

<Production of Insert Molded Article>

The same operation and the same evaluation as in Example 7 were performed except that pellets of PC12 were used instead of PC10 in Example 7, and molding was performed at a cylinder temperature of 275° C. The evaluation results are shown in Table 1.

Example 10

The operation was performed in exactly the same manner as in Example 1, except that 99 parts of ISS, 73 parts of BPA, and 214 parts of DPC were used as raw materials, and the same evaluation was performed (PC4) The results are shown in Table 1.

<Production of Insert Molded Article>

The same operation and the same evaluation as in Example 1 were performed except that pellets of PC4 were used instead of PC1 in Example 1. The evaluation results are shown in Table 1.

Example 11

<Production of Insert Molded Article>

The same operation and the same evaluation as in Example 10 were performed except that pellets of PC11 were used instead of PC10 in Example 10, and molding was performed at a cylinder temperature of 275° C. The evaluation results are shown in Table 1.

Example 12

<Production of Insert Molded Article>

The same operation and the same evaluation as in Example 10 were performed except that pellets of PC12 were used instead of PC10 in Example 10, and molding was performed at a cylinder temperature of 275° C. The evaluation results are shown in Table 1.

Comparative Example 1

<Production of Polycarbonate Resin A>

The operation was performed in exactly the same manner as in Example 1, except that 100 parts of ISS, 5 parts of BPA, and 176 parts of DPC were used as raw materials, and the same evaluation was performed (PC5). The results are shown in Table 1.

<Production of Insert Molded Article>

The same operation and the same evaluation as in Example 1 were performed except that pellets of PC5 were used instead of PC1 in Example 1. The evaluation results are shown in Table 1. The obtained laminate had low adhesion between the resins, and thus was not capable of achieving the original purpose.

Comparative Example 2

<Production of Insert Molded Article>

The same operation and the same evaluation as in Comparative Example 1 were performed except that pellets of PC11 were used instead of PC10 in Comparative Example 1, and molding was performed at a cylinder temperature of 275° C. The evaluation results are shown in Table 1. The obtained laminate had low adhesion between the resins, and thus was not capable of achieving the original purpose.

Comparative Example 3

<Production of Insert Molded Article>

The same operation and the same evaluation as in Comparative Example 1 were performed except that pellets of PC12 were used instead of PC10 in Comparative Example 1, and molding was performed at a cylinder temperature of 275° C. The evaluation results are shown in Table 1. The obtained laminate had low adhesion between the resins, and thus was not capable of achieving the original purpose.

Comparative Example 4

<Production of Polycarbonate Resin A>

The operation was performed in exactly the same manner as in Example 1, except that 332 parts of ISS, 319 parts of SPG, 28 parts of ND, and 750 parts of DPC were used as raw materials, and the same evaluation was performed (PC6). The results are shown in Table 1.

<Production of Insert Molded Article>

The same operation and the same evaluation as in Example 1 were performed except that pellets of PC6 were used instead of PC1 in Example 1. The evaluation results are shown in Table 1. The obtained laminate was insufficient in chemical resistance and also inferior in impact resistance, and thus was not capable of achieving the original purpose.

Comparative Example 5

<Production of Insert Molded Article>

The same operation and the same evaluation as in Comparative Example 4 were performed except that pellets of PC11 were used instead of PC10 in Comparative Example 4, and molding was performed at a cylinder temperature of 275° C. The evaluation results are shown in Table 1. The obtained laminate was insufficient in chemical resistance and also inferior in impact resistance, and thus was not capable of achieving the original purpose.

Comparative Example 6

<Production of Insert Molded Article>

The same operation and the same evaluation as in Comparative Example 4 were performed except that pellets of PC12 were used instead of PC10 in Comparative Example 4, and molding was performed at a cylinder temperature of 275° C. The evaluation results are shown in Table 1. The obtained laminate was insufficient in chemical resistance and also inferior in impact resistance, and thus was not capable of achieving the original purpose.

Comparative Example 7

<Production of Polycarbonate Resin A>

The operation was performed in exactly the same manner as in Example 1, except that 256 parts of ISS, 252 parts of CHDM, and 750 parts of DPC were used as raw materials, and the same evaluation was performed (PC7). The results are shown in Table 1.

<Production of Insert Molded Article>

The same operation and the same evaluation as in Example 1 were performed except that pellets of PC7 were used instead of PC1 in Example 1. The evaluation results are shown in Table 1. The obtained laminate was insufficient in chemical resistance and also inferior in impact resistance and surface hardness, and thus was not capable of achieving the original purpose.

Comparative Example 8

<Production of Insert Molded Article>

The same operation and the same evaluation as in Comparative Example 7 were performed except that pellets of PC11 were used instead of PC10 in Comparative Example 7, and molding was performed at a cylinder temperature of 275° C. The evaluation results are shown in Table 1. The obtained laminate was insufficient in chemical resistance and also inferior in impact resistance and surface hardness, and thus was not capable of achieving the original purpose.

Comparative Example 9

<Production of Insert Molded Article>

The same operation and the same evaluation as in Comparative Example 7 were performed except that pellets of PC12 were used instead of PC10 in Comparative Example 7, and molding was performed at a cylinder temperature of 275° C. The evaluation results are shown in Table 1. The obtained laminate was insufficient in chemical resistance and also inferior in impact resistance and surface hardness, and thus was not capable of achieving the original purpose.

Comparative Example 10

<Production of Polycarbonate Resin>

The operation was performed in exactly the same manner as in Example 1, except that 358 parts of ISS, 151 parts of CHDM, and 750 parts of DPC were used as raw materials, and the same evaluation was performed (PC8). The results are shown in Table 1.

<Production of Insert Molded Article>

The same operation and the same evaluation as in Example 1 were performed except that pellets of PC8 were used instead of PC1 in Example 1. The evaluation results are shown in Table 1. The obtained laminate had low adhesion between the resins, and thus was not capable of achieving the original purpose.

Comparative Example 11

<Production of Insert Molded Article>

The same operation and the same evaluation as in Comparative Example 10 were performed except that pellets of PC11 were used instead of PC10 in Comparative Example 10, and molding was performed at a cylinder temperature of 275° C. The evaluation results are shown in Table 1. The obtained laminate had low adhesion between the resins, and thus was not capable of achieving the original purpose.

Comparative Example 12

<Production of Insert Molded Article>

The same operation and the same evaluation as in Comparative Example 10 were performed except that pellets of PC12 were used instead of PC10 in Comparative Example 10, and molding was performed at a cylinder temperature of 275° C. The evaluation results are shown in Table 1. The obtained laminate had low adhesion between the resins, and thus was not capable of achieving the original purpose.

Comparative Example 13

<Production of Polycarbonate Resin>

The operation was performed in exactly the same manner as in Example 1, except that 358 parts of ISS, 206 parts of TCDDM, and 750 parts of DPC were used as raw materials, and the same evaluation was performed (PC9). The results are shown in Table 1.

<Production of Insert Molded Article>

The same operation and the same evaluation as in Example 1 were performed except that pellets of PC9 were used instead of PC1 in Example 1. The evaluation results are shown in Table 1. The obtained laminate had low adhesion between the resins, and thus was not capable of achieving the original purpose.

Comparative Example 14

<Production of Insert Molded Article>

The same operation and the same evaluation as in Comparative Example 13 were performed except that pellets of PC11 were used instead of PC10 in Comparative Example 13, and molding was performed at a cylinder temperature of 275° C. The evaluation results are shown in Table 1. The obtained laminate had low adhesion between the resins, and thus was not capable of achieving the original purpose.

Comparative Example 15

<Production of Insert Molded Article>

The same operation and the same evaluation as in Comparative Example 13 were performed except that pellets of PC12 were used instead of PC10 in Comparative Example 13, and molding was performed at a cylinder temperature of 275° C. The evaluation results are shown in Table 1. The obtained laminate had low adhesion between the resins, and thus was not capable of achieving the original purpose.

Comparative Example 16

<Production of Insert Molded Article>

The operation was performed in exactly the same manner as in Example 1, except that PMMA (Acrypet MF manufactured by Mitsubishi Rayon Co., Ltd.) was used instead of the polycarbonate resin (A), and the same evaluation was performed. The obtained laminate was below the satisfactory level in terms of heat resistance, chemical resistance, and impact resistance, and thus was not capable of achieving the original purpose.

Comparative Example 17

<Production of Insert Molded Article>

The same operation and the same evaluation as in Comparative Example 13 were performed except that pellets of PC11 were used instead of PC10 in Comparative Example 16, and molding was performed at a cylinder temperature of 275° C. The evaluation results are shown in Table 1. The obtained laminate was below the satisfactory level in terms of heat resistance, chemical resistance, and impact resistance, and thus was not capable of achieving the original purpose.

Comparative Example 18

<Production of Insert Molded Article>

The same operation and the same evaluation as in Comparative Example 16 were performed except that pellets of PC12 were used instead of PC10 in Comparative Example 16, and molding was performed at a cylinder temperature of 275° C. The evaluation results are shown in Table 1. The obtained laminate was below the satisfactory level in terms of heat resistance, chemical resistance, and impact resistance, and thus was not capable of achieving the original purpose.

Comparative Example 19

The pellets of PC10 were dried at 120° C. for 12 hours by a hot air dryer, and molded at a cylinder temperature of 300° C. and a mold temperature of 80° C. by a molding machine having a mold clamping force of 100 t to obtain a molded article having a thickness of 2 mm. The obtained molded article was subjected to evaluations of surface hardness, chemical resistance, and impact resistance by the above-described evaluation methods. The evaluation results are shown in Table 1. The obtained molded article was insufficient in chemical resistance and also inferior in surface hardness.

Comparative Example 20

The pellets of PC11 were dried at 120° C. for 12 hours by a hot air dryer, and molded at a cylinder temperature of 270° C. and a mold temperature of 80° C. by a molding machine having a mold clamping force of 100 t to obtain a molded article having a thickness of 2 mm. The obtained molded article was subjected to evaluations of surface hardness, chemical resistance, and impact resistance by the above-described evaluation methods. The evaluation results are shown in Table 1. The obtained molded article was insufficient in chemical resistance and also inferior in surface hardness.

Comparative Example 21

The pellets of PC12 were dried at 120° C. for 12 hours by a hot air dryer, and molded at a cylinder temperature of 270° C. and a mold temperature of 80° C. by a molding machine having a mold clamping force of 100 t to obtain a molded article having a thickness of 2 mm. The obtained molded article was subjected to evaluations of surface hardness, chemical resistance, and impact resistance by the above-described evaluation methods. The evaluation results are shown in Table 1. The obtained molded article was insufficient in chemical resistance and also inferior in surface hardness.

TABLE 1

| | Layer composition | | | | | | | |
|---|---|---|---|---|---|---|---|---|
| | First layer (Decorative film) | Second layer (Core material) | Composition (First layer) | Tg (First layer) | Surface hardness | Adhesion | Chemical resistance | Impact resistance |
| Ex. 1 | PC1 | PC10 | ISS/BPA/ND = 81/7/12 | 123 | F | A | A | A |
| Ex. 2 | | PC11 | | | | A | A | A |
| Ex. 3 | | PC12 | | | | A | A | A |
| Ex. 4 | PC2 | PC10 | ISS/BPA/ND = 73/20/7 | 136 | F | A | A | A |
| Ex. 5 | | PC11 | | | | A | A | A |
| Ex. 6 | | PC12 | | | | A | A | A |
| Ex. 7 | PC3 | PC10 | ISS/BPA/ND = 60/30/10 | 124 | F | A | A | A |
| Ex. 8 | | PC11 | | | | A | A | A |
| Ex. 9 | | PC12 | | | | A | A | A |
| Ex. 10 | PC4 | PC10 | ISS/BPA = 68/32 | 152 | HB | A | A | A |
| Ex. 11 | | PC11 | | | | A | A | A |
| Ex. 12 | | PC12 | | | | A | A | A |
| Comp. Ex. 1 | PC5 | PC10 | ISS/BPA/ND = 84/3/13 | 123 | F | C | A | A |
| Comp. Ex. 2 | | PC11 | | | | C | A | A |
| Comp. Ex. 3 | | PC12 | | | | C | A | A |
| Comp. Ex. 4 | PC6 | PC10 | ISS/SPG/ND = 65/30/5 | 120 | H | A | C | C |
| Comp. Ex. 5 | | PC11 | | | | A | C | C |
| Comp. Ex. 6 | | PC12 | | | | A | C | C |
| Comp. Ex. 7 | PC7 | PC10 | ISS/CHDM = 50/50 | 100 | HB | A | C | C |
| Comp. Ex. 8 | | PC11 | | | | A | C | C |
| Comp. Ex. 9 | | PC12 | | | | A | C | C |
| Comp. Ex. 10 | PC8 | PC10 | ISS/CHDM = 70/30 | 120 | F | C | A | A |
| Comp. Ex. 11 | | PC11 | | | | C | A | A |
| Comp. Ex. 12 | | PC12 | | | | C | A | A |
| Comp. Ex. 13 | PC9 | PC10 | ISS/TCDDM = 70/30 | 129 | H | C | A | C |
| Comp. Ex. 14 | | PC11 | | | | C | A | C |
| Comp. Ex. 15 | | PC12 | | | | C | A | C |
| Comp. Ex. 16 | PMMA | PC10 | — | 108 | 2H | A | C | C |
| Comp. Ex. 17 | | PC11 | | | | A | C | C |
| Comp. Ex. 18 | | PC12 | | | | A | C | C |
| Comp. Ex. 19 | — | PC10 | — | 145 | 2B | — | C | A |
| Comp. Ex. 20 | — | PC11 | — | | 2B | — | C | A |
| Comp. Ex. 21 | — | PC12 | — | 120 | 2B | — | C | A |

INDUSTRIAL APPLICABILITY

The multilayer body of the present invention is useful as a building material, an interior material, a transparent sheet such as a display cover, a sheet for resin-coated metal plates, a sheet for forming (vacuum/pressure forming, hot press forming, etc.), a colored plate, a transparent plate, a shrink film, a shrink label, a shrink tube, an automotive interior material, resin glazing, an electrical appliance member, or an OA appliance member.

The invention claimed is:

1. A multilayer body comprising:
   at least one layer (A) made of a polycarbonate resin (A) whose main repeating units include a unit (a-1) composed of an ether diol residue represented by the following formula (1), a unit (a-2) composed of a diol residue represented by the following formula (2), and a carbonate unit (a-3) composed of an aliphatic diol or alicyclic diol residue; and
   at least one layer (B) containing an aromatic polycarbonate resin (B),
wherein the at least one layer (A) made of the polycarbonate resin (A) has a surface hardness of F or higher, wherein the molar ratio of the unit (a-1) is 50 to 95 mol %, the molar ratio of the unit (a-2) is 4 to 49 mol %, and the molar ratio of the unit (a-3) is 1 to 20 mol %, with respect to 100 mol % of the total repeating units of the polycarbonate resin (A), and the proportion of the aromatic polycarbonate resin (B) in the layer (B) containing an aromatic polycarbonate resin (B) is 30% by weight or more:

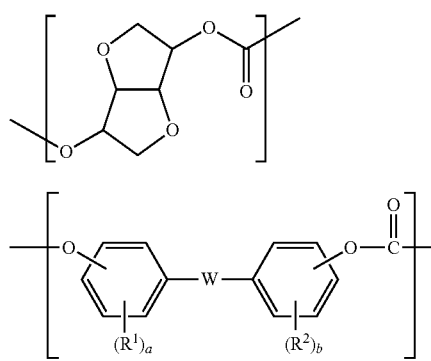

wherein in the formula (2), $R^1$ and $R^2$ each independently represent a hydrogen atom, a and b each represent an integer of 1 to 4; and W represents at least one bonding group selected from the group consisting of a single bond and a bonding group represented by the following formula (3):

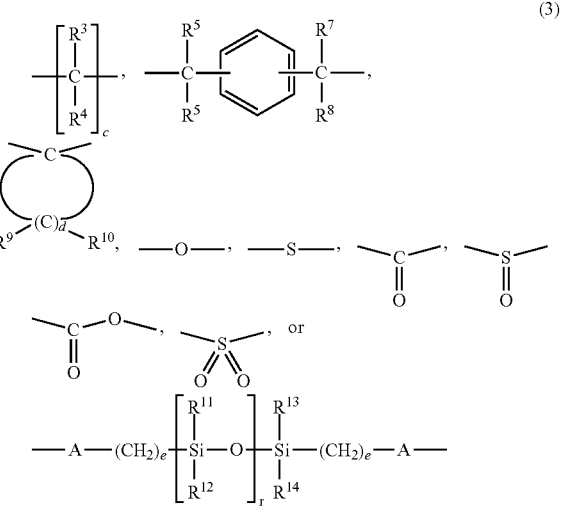

wherein in the formula (3), $R^3$, $R^4$, $R^5$, $R^6$, $R^7$, $R^8$, $R^9$, and $R^{10}$ each independently represent at least one group selected from the group consisting of a hydrogen atom, an alkyl group having 1 to 10 carbon atoms, an aryl group having 6 to 10 carbon atoms, and an aralkyl group having 7 to 20 carbon atoms, and when a plurality of $R^3$, $R^4$, $R^5$, $R^6$, $R^7$, $R^8$, $R^9$, and $R^{10}$ are present, they may be the same or different; $R^{11}$, $R^{12}$, $R^{13}$, and $R^{14}$ each independently represent at least one group selected from the group consisting of an alkyl group having 1 to 10 carbon atoms, a cycloalkenyl group having 6 to 20 carbon atoms, an alkenyl group having 2 to 10 carbon atoms, an aryl group having 6 to 10 atoms, and an aralkyl group having 7 to 20 carbon atoms, and when a plurality of $R^{11}$, $R^{12}$, $R^{13}$, and $R^{14}$ are present, they may be the same or different; A represents a single bond, an oxygen atom or a sulfur atom; c represents an integer of 1 to 10; d represents an integer of 4 to 7; e represents an integer of 1 to 10; and f represents an integer of 1 to 100.

2. The multilayer body according to claim 1, wherein the polycarbonate resin (A) has a glass transition temperature of 100° C. to 160° C.

3. The multilayer body according to claim 1, wherein the aromatic polycarbonate resin (B) has a glass transition temperature of 120° C. to 180° C.

4. The multilayer body according to claim 1, wherein the aromatic polycarbonate resin (B) is a polycarbonate resin using a dihydric phenol containing bisphenol A as a raw material.

* * * * *